Dec. 31, 1963   H. M. HOCHREITER   3,115,777
MASS FLOWMETER
Filed Oct. 21, 1958   2 Sheets-Sheet 1

FIG. I.

INVENTOR.
HARRY M. HOCHREITER
BY
ATTORNEYS

Dec. 31, 1963  H. M. HOCHREITER  3,115,777
MASS FLOWMETER
Filed Oct. 21, 1958  2 Sheets-Sheet 2

INVENTOR.
HARRY M. HOCHREITER
BY
ATTORNEYS

United States Patent Office 3,115,777
Patented Dec. 31, 1963

3,115,777
MASS FLOWMETER
Harry M. Hochreiter, Abington, Pa., assignor to Fischer & Porter Company, Hatboro, Pa., a corporation of Pennsylvania
Filed Oct. 21, 1958, Ser. No. 768,630
2 Claims. (Cl. 73—194)

This invention relates to a mass flowmeter for the direct measurement of mass or weight flow rate through a conduit, independent of density variations.

Measurement of mass flow rate has been achieved by various methods which are either relatively inaccurate or involve complex apparatus. Among the methods used or proposed may be mentioned density compensated variable area meters, meters dependent upon measurement of momentum, meters dependent on inherently volumetric flow rate measurements combined with specific gravity sensing means, etc.

In accordance with the present invention a relatively simple mass flowmeter is provided which is simple in both its mechanical and electrical parts and which, nevertheless, will measure mass flow rate to a high degree of accuracy. Its principle involves the measurement of two flow characteristics, each of which provides an output, with the further provision of means providing a quotient of the outputs, the quotient being directly in units of mass flow rate. In the preferred form of the apparatus, a member is provided within the flow conduit which is subject to impact of the fluid, the member being of a form which renders the force thereon substantially independent of viscosity. The force on this member is measured providing an output which is proportional to $\rho Q^2$, wherein $\rho$ is the density of the fluid flowing through the conduit and Q is the volumetric flow rate. Associated with the last mentioned means is a volumetric meter of the turbine type the speed of which is proportional to Q. Means for measuring the speed provides an output proportional to Q, and by dividing this last mentioned output into the one previously mentioned there is produced a measurement of $\rho Q$, the mass flow rate. The final indication is thus given in proper terms irrespective of changes of density and volumetric rate of flow.

The broad object of the invention relates to the attainment of the results just indicated. This object as well as others relating particularly to details of construction and operation will become apparent from the following description, read in conjunction with the accompanying drawings, in which.

Figure 1:
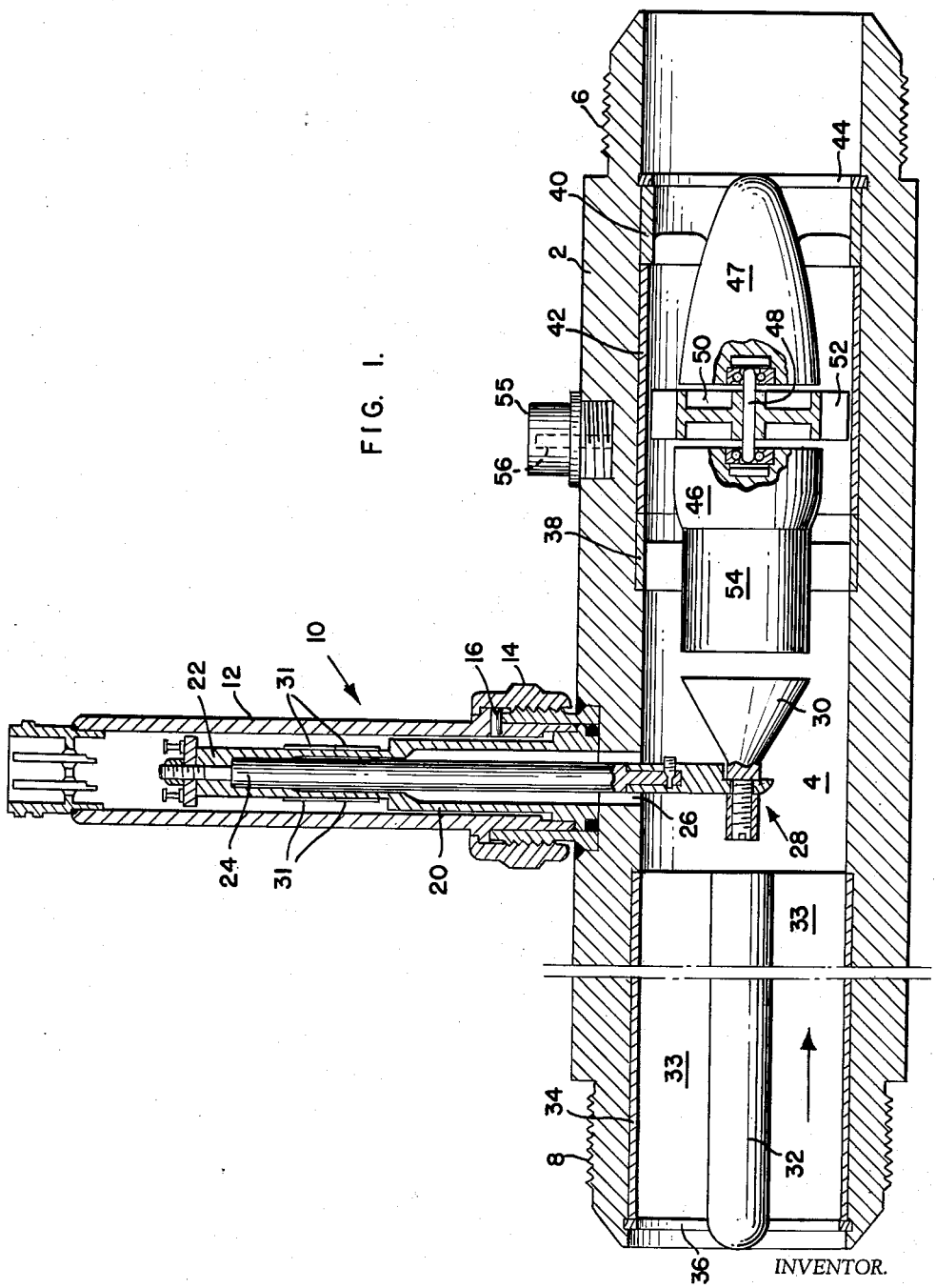
FIGURE 1 is a vertical section taken through a portion of a flow conduit and showing the mechanical flow responsive elements involved in a preferred form of the meter.

Referring first to FIGURE 1, there is illustrated at 2 a tubular fitting providing a conduit 4 which receives the flow to be measured and contains the flow responsive means required in the preferred embodiment of the invention. As will become evident, the two flow responsive means provided may be separated, if desired, but it is more usually desirable to have them closely adjacent to each other so that they are acting substantially simultaneously on the same portion of the flowing fluid having the same density and volumetric flow rate. As will be apparent, the invention is applicable to measurement of both gaseous and liquid flow, but for convenience in the present description, it may be assumed that the conduit 4 contains flowing liquid. Threads 6 and 8 at the ends of the tube 4 provide for the association of the assembly shown in FIGURE 1 with inlet and outlet conduits.

Conveniently used to provide the $\rho Q^2$ output is an impact arrangement of a type well known per se. This is indicated at 10 and comprises a tubular housing 12 which is clamped by means of a nut 14 to the tubular member 2, the arrangement providing for alignment with respect to the tube axis by the use of an aligning pin 16. Clamped in position by this arrangement is the base 20 of a sensing tube, the upper portion 22 of which is subject to flexure by its connection to the upper end of a rod 24 which projects inwardly through an opening 26 in the wall of the tubular member and is connected by a suitable assembly indicated at 28 to a flow sensing element 30 which, in order to have a minimum of sensitivity to viscosity is conical in form with its apex directed toward the source of flow, the direction of flow being indicated by the arrow in FIGURE 1. Mounted on the upper portion 22 of the sensing tube 20 are the strain gauge elements 31 disposed in conventional fashion, one pair of them being horizontal and the other vertical, thereby to provide the usual temperature compensation together with sensitivity to flexure of the tube. As will be more clearly apparent from the wiring diagram of FIGURE 2, described later in detail, these strain gauge elements are assembled in an electrical bridge to provide an output measuring the force on the sensing element 30. The sensing element 30 is of a type well known in the rotameter art, from which it is known that the force exerted thereon in the direction of flow is proportional to $\rho Q^2$, the strain gauge element bridge providing an output proportional to this force.

The sensing element 30 is aligned with the axis of the tubular conduit 4, and to provide uniform flow impacting this element there is desirably mounted in the approach portion of the conduit 4 a central cylindrical rod 32 supported by radial webs 33 from a cylinder 34 retained in the inlet portion of the conduit by a snap ring 36.

In the exit portion of the conduit cylindrical members 38 and 40 are mounted, together with a spacing tube 42 by means of the snap ring 44, supporting by means of radial webs the bearing housings 46 and 47.

As will be noted, the housings 46 and 47, an extension 54 of the former, and the cylindrical vane-carrying surface of the hub of rotor 50 provide a smooth flow-guiding surface which, at its inlet end closely approaches the larger end of sensing element 30, the diameter of extension 54 being approximately equal to the maximum diameter of element 30, with the result that there is minimizing of disturbances which might otherwise arise due to turbulence. Also avoided is excessive pressure changes which would occur if the velocity-measuring assembly was spaced from element 30.

Threaded into a socket adjacent to the vanes, which are of ferromagnetic material, is a pick-up assembly comprising a plug 55 which houses a permanent magnet 56 surrounded by a winding 58 which provides an alternating output at a frequency corresponding to that of passage of vanes past the axis of the magnet, the plug and the member 2 being of non-magnetic material. This freqeuncy is proportional to Q, the volumetric flow rate through the conduit.

Figure 2:
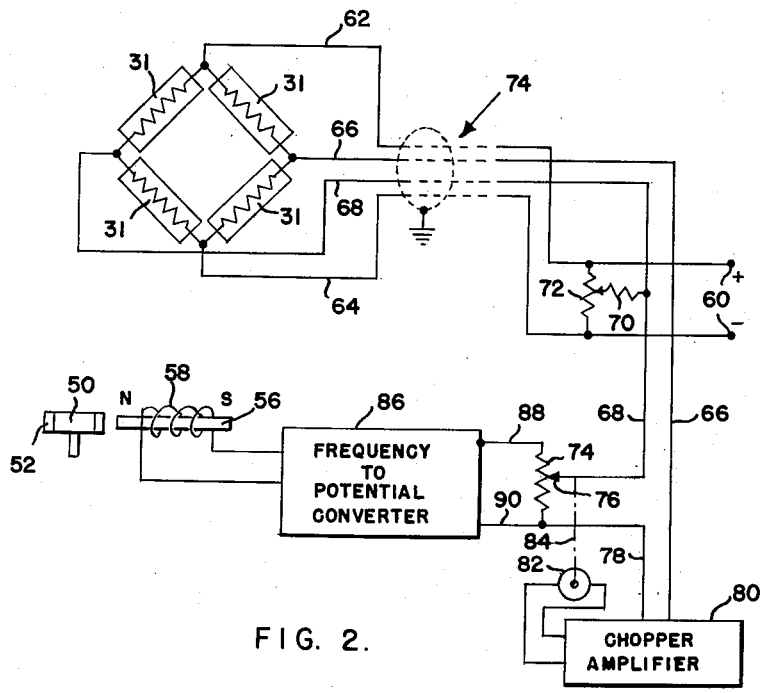
FIGURE 2 is a wiring diagram showing the electrical elements involved in providing desired outputs and for effecting their division.

Reference may now be made to FIGURE 2 which shows the electrical parts of the apparatus and, diagrammatically, the turbine rotor 50, its vanes 52, the permanent magnet 56 and the signal pick-up winding 58. This figure also shows the strain gauge elements 31 arranged in their bridge.

Assuming energization of the strain gauge bridge by direct current, two of the opposite terminals of the bridge are connected to the direct current source 60 by connections 62 and 64, while the other terminals are connected at 66 and 68 with the receiving means for the bridge output. The several elements of the strain gauge bridge are, of course, connected in conventional fashion to provide maximum output, which, as previously stated, is proportional to $\rho Q^2$.

For balancing purposes, one of the connections, say 68, is connected through resistor 70 to the contact of a potentiometer 72 bridging the supply terminals 60. Adjustment of the potentiometer contact serves to properly balance the system. As indicated by the dotted lines at 74, the detecting means may be remote from the bridge, being connected thereto through a cable.

The connection 68 runs to the movable contact 76 of a potentiometer 74, the lower illustrated terminal of which is connected to one input terminal of a conventional chopper amplifier 80, the other input terminal of which is connected to connection 66. The winding 58 delivers its alternating output to a frequency to potential converter 86 which may take numerous known forms, such converters being available on the market. The output of such converter is in the form of a potential proportional to frequency and is delivered through connections 88 and 90 to the terminals of the potentiometer 74. As a result, the input to the chopper amplifier consists of the algebraic sum of the output from the strain gauge bridge and the potential existing between the contact 76 and the lower terminal of potentiometer 74. As will appear, this algebraic sum is automatically reduced to zero, whereupon the position of the contact 76 constitutes a direct measure of the value of the mass flow rate, $\rho Q$. If the potentiometer 74 is of linear type, the calibration is linear.

The potentiometer contact 76 has its position adjusted through a mechanical connection indicated at 84 from a motor-reduction gear arrangement indicated at 82 which is driven by the output from the amplifier 80. This amplifier will be such that, assuming a direct output due to synchronous rectification of the amplified alternating input signal, the sign of the output to the motor of the assembly 82 will change with the sign of the deviation of the net input relative to zero. If, therefore, the motor 82 is of direct current type having its field provided by a small D.C. winding or by a permanent magnet, the motor will reverse in accordance with the direction of deviation of the input from zero. The arrangement is, of course, made so that the potentiometer contact 76 will be driven to effect a zero input to the amplifier. An alternating current motor may, of course, be provided at 82 if the ultimate output of the chopper amplifier is alternating, in which case one motor winding will be energized from the alternating current supply driving the chopper through a phase adjusting network, reversal of the motor then occurring with reversal of phase relationships of the inputs.

It will now be evident that the position of the contact 76 with respect to the lower terminal of the potentiometer will be a direct measure of the ratio of $\rho Q^2$ to $Q$, this ratio being proportional to the ratio of the resistance between contact 76 and the lower terminal of the potentiometer to the full resistance of the potentiometer. Thus the system provides, as a measure of the quotient $\rho Q$, the position of the contact 76. The potentiometer may be of the indicating type, or of the recording type, in the latter case providing a chart of the variation of mass flow rate with time. Integration of such a chart between two times will give the total mass flow through the corresponding interval.

Figure 3:
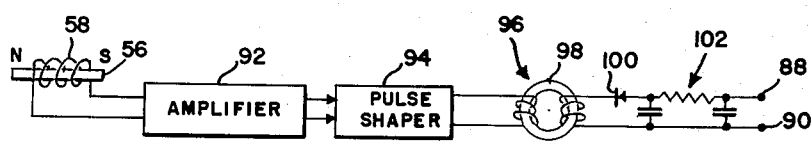
FIGURE 3 is a wiring diagram showing, in particular, elements which may be involved in securing an output potential which is proportional to speed of a volumetric turbine meter.

While, as stated, the frequency to potential converter 86 is known, to give a further indication of its nautre, its form is diagrammed in FIGURE 3. It comprises an amplifier 92 (commercially of transistor type) which provides the amplified alternating input to a pulse shaper 94 which delivers rectangular waves at the same frequency as the input to a saturable core transformer 96 of toroidal type having a core 98. The secondary output of this transformer is rectified by the diode 100, and the rectified output is filtered by the low pass filter 102 to provide a direct voltage at the connections 88 and 90 previously described in connection with FIGURE 2. The voltage thus appearing is proportional to the frequency of the input derived from the coil 58. The pulse shaper has a limiting function, and desirably its limiting reference potential is derived from the same regulated direct current source which provides the terminals 60 so that a fixed constant of proportionality is assured between the direct current supplies. Thus, the quotient which is represented by the position of the adjustable contact 76 is independent of supply variations.

Figure 4:
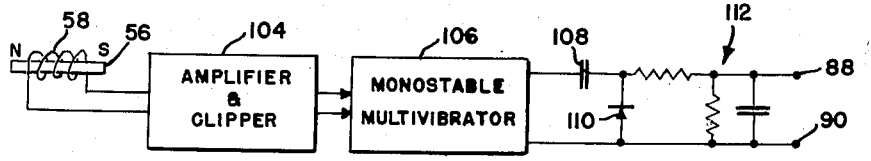
FIGURE 4 is a wiring diagram showing an alternative arrangement for providing the same.

An alternate form of frequency to potential converter is illustrated in FIGURE 4, in which the output from the pick-up coil 58 is fed to an amplifier and clipper 104 which, in turn, controls a monostable multivibrator 106 providing an alternating output through a small stable capacitor 108 to the rectifier 110 followed by the low pass filter arrangement at 112 to provide between terminals 88 and 90 a voltage proportional to the frequency and accordingly proportional to the speed of the turbine meter.

Figure 5:
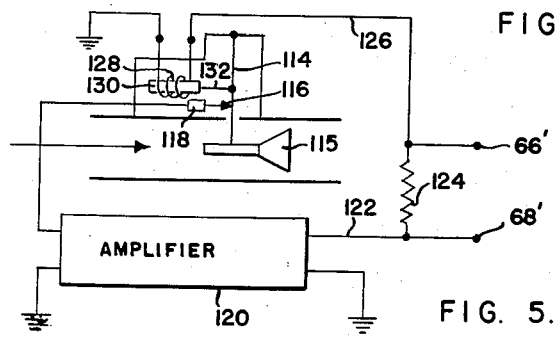
FIGURE 5 is a mechanical and wiring diagram showing an arrangement, alternative to that shown in FIGURE 2, for providing an electrical output proportional to the force exerted on an impact member.

While for detection of the quantity $\rho Q^2$ the strain gauge arrangement of FIGURES 1 and 2 is quite satisfactory, the motion of the flow sensing element 30 being so slight as not to affect its orientation appreciably with respect to the axis of the flow, there may be used an arrangement such as illustrated in FIGURE 5 in which movement of a flow sensing element 115 corresponding to the element 30 in FIGURE 1 is substantially zero. In this arrangement, the flow sensing element 115 is mounted on a lever or flexible beam 114 and is arranged to engage a plunger 116 which may serve to act on the diaphragm of a microphone 118, for example of the carbon granule type. This microphone is connected in series with an amplifier which will provide a direct current through the microphone sensitive to the pressure exerted on the microphone diaphragm. This amplifier 120 provides an output through connection 122 and resistor 124 and connection 126 to the winding 128 of what may be a loudspeaker motor conventionalized as having a movable element 130 on which a force is exerted proportional to the current through the winding 128. The movable element is mechanically connected at 132 to the lever or flexible beam 114, the feedback arrangement being such that the pressure exerted on the diaphragm of microphone 118 is maintained constant. In such case, the current flowing through the resistor 124 and through the winding 128 is proportional to the force, $\rho Q^2$, exerted on the sensing element 115. The potential appearing across the resistor 124 is fed to connections indicated in FIGURE 5 at 66' and 68', corresponding to those shown in FIGURE 2 at 66 and 68. The remainder of the circuitry, not shown in FIGURE 5, may be as illustrated in FIGURE 2, what is shown in FIGURE 5 being merely a substitute for the strain gauge arrangement shown in FIGURE 2.

From what has been described, it will be evident that various elements of the meter may take different equivalent forms, particularly from the electrical standpoint, with the common result, however, of securing a direct indication or recording of the mass flow rate $\rho Q$ by providing the quotient resulting from the division of $\rho Q^2$ by $Q$. No excessive impedance to flow of the fluid is introduced, there being required very little energy to rotate the turbine rotor. Negligible drag is imposed on the ferromagnetic blades of the turbine rotor by the permanent magnet 56, there being required only a very small output from the winding 58 in view of the amplification which is provided. In fact, the overall amplification required may be very small since the output of a strain gauge bridge or a microphone such as 118 is quite small so that the potential across a potentiometer such as 74 may be correspondingly small.

It will be evident that numerous variations may be made in the embodiment of the invention which is not to be considered as limited except as required by the following claims.

What is claimed is:

1. A mass flowmeter comprising means providing a conduit for fluid flow, a member within said conduit subject to impact of the fluid and shaped to provide a force on said member substantially proportional to $\rho Q^2$, means measuring said force on said member to provide a first output substantially proportional to said $\rho Q^2$, wherein $\rho$ is the density of fluid flowing through said conduit and Q is the volumetric flow rate through said conduit, means providing a second output substantially proportional to Q, and means receiving said outputs and providing an indication of the quotient of the value of the first output by the value of the second output, said means providing the second output comprising an assembly including a rotor driven by the flow and a bearing mount for the rotor mounted in the conduit to provide an annular passage for the fluid flow, and means mounting said member concentrically with said assembly and closely adjacent thereto and in advance thereof.

2. A mass flowmeter comprising means providing a conduit for fluid flow, a member within said conduit subject to impact of the fluid and shaped to provide a force on said member substantially proportional to $\rho Q^2$, means measuring said force on said member to provide a first output substantially proportional to said $\rho Q^2$, wherein $\rho$ is the density of fluid flowing through said conduit and Q is the volumetric flow rate through said conduit, means providing a second output substantially proportional to Q, and means receiving said outputs and providing an indication of the quotient of the value of the first output by the value of the second output, said means providing the second output comprising an assembly including a rotor driven by the flow and a bearing mount for the rotor mounted in the conduit to provide an annular passage for the fluid flow, and means mounting said member concentrically with said assembly and closely adjacent thereto and in advance thereof, said member being of conical shape with its large diameter portion downstream of the flow.

References Cited in the file of this patent

UNITED STATES PATENTS

| 720,188 | Seidener | Feb. 10, 1903 |
| 2,472,609 | Moore | June 7, 1949 |
| 2,697,942 | Engelder | Dec. 28, 1954 |
| 2,772,567 | Boden et al. | Dec. 4, 1956 |
| 2,812,661 | Cox | Nov. 12, 1957 |
| 2,826,914 | Reiley | Mar. 18, 1958 |